(12) United States Patent
Radichio

(10) Patent No.: US 6,718,789 B1
(45) Date of Patent: Apr. 13, 2004

(54) PIPE FREEZER WITH DEFROST CYCLE

(76) Inventor: Arthur Radichio, 89 Gate La., Levittown, NY (US) 11756

( * ) Notice: Subject to any disclaimer, the term of this patent is extended or adjusted under 35 U.S.C. 154(b) by 0 days.

(21) Appl. No.: 10/428,283

(22) Filed: May 2, 2003

Related U.S. Application Data

(60) Provisional application No. 60/378,187, filed on May 4, 2002.

(51) Int. Cl.[7] ................................. F25D 3/00
(52) U.S. Cl. .................. 62/293; 137/13; 137/251.1; 137/828; 165/80.1
(58) Field of Search ................. 62/293, 66, 277, 62/278, 513; 137/13, 251.1, 828; 165/80.1

(56) References Cited

U.S. PATENT DOCUMENTS

| | | | | |
|---|---|---|---|---|
| 2,120,764 A | * | 6/1938 | Newton | 62/83 |
| 3,677,025 A | * | 7/1972 | Payne | 62/81 |
| 3,926,006 A | * | 12/1975 | Brooks et al. | 62/66 |
| 4,095,438 A | | 6/1978 | Kramer | |
| 4,220,012 A | * | 9/1980 | Brister | 62/130 |
| 4,267,699 A | * | 5/1981 | Bahrenburg | 62/66 |
| 4,324,109 A | | 4/1982 | Garland | |
| 4,932,219 A | * | 6/1990 | Howland et al. | 62/174 |
| 4,942,743 A | | 7/1990 | Gregory | |
| 4,944,161 A | * | 7/1990 | Van Der Sanden | 62/293 |
| 4,949,551 A | | 8/1990 | Gregory | |
| 5,065,584 A | | 11/1991 | Byczynski et al. | |
| 5,157,935 A | | 10/1992 | Gregory | |
| 5,548,965 A | * | 8/1996 | Chen et al. | 62/66 |
| 5,836,167 A | | 11/1998 | Clouston et al. | |
| 5,916,254 A | | 6/1999 | Cho | |
| 6,082,125 A | | 7/2000 | Savtchenko | |
| 6,089,033 A | | 7/2000 | Dube | |
| 6,286,329 B1 | | 9/2001 | Radichio | |
| 6,351,959 B1 | * | 3/2002 | Hirota | 62/198 |
| 6,408,638 B1 | * | 6/2002 | Chen | 62/293 |
| 6,434,952 B2 | * | 8/2002 | Wagner | 62/66 |
| 6,519,956 B2 | * | 2/2003 | Bagley | 62/156 |
| 6,584,794 B2 | * | 7/2003 | Takeuchi et al. | 62/278 |
| 6,595,015 B2 | * | 7/2003 | Fujii et al. | 62/228.3 |
| 6,598,412 B1 | * | 7/2003 | Chen | 62/293 |

FOREIGN PATENT DOCUMENTS

| | | |
|---|---|---|
| DE | 19516454 A1 * | 11/1996 |
| EP | 0813020 A2 * | 12/1997 |

* cited by examiner

*Primary Examiner*—William E. Tapolcai
*Assistant Examiner*—Mohammad M. Ali
(74) *Attorney, Agent, or Firm*—Michael D. Fitzpatrick

(57) ABSTRACT

A compact, inexpensive pipe freezer with defrost cycle for forming a frozen ice plug in a section of pipe to be repaired, and, after the repair operation has been completed, defrosting the pipe freezer's evaporator and freeze heads so that the pipe freezer can be removed from the frozen pipe without damaging the pipe freezer.

7 Claims, 9 Drawing Sheets

PIPE FREEZER WITH DEFROST CYCLE

RELATED APPLICATIONS

This application claims the benefit of U.S. Provisional Application No. 60/378,187 filed on May 4, 2002.

STATEMENT REGARDING FEDERALLY SPONSORED RESEARCH

This invention was not made with Government support.

FIELD OF THE INVENTION

The present invention relates to an apparatus which is attached to a liquid-filled pipe for freezing a plug of frozen liquid in the liquid-filled pipe, in order to plug said pipe at a point where there is no conventional valve, so that pipe repairs can be performed downstream of the plug, and then for defrosting the freeze heads and evaporator so that the apparatus can be quickly and easily removed from the frozen pipe without damaging the apparatus.

BACKGROUND

Introduction

A pipe freezer works by removing heat quickly enough from the liquid within a section of pipe that an ice plug forms in that section of pipe, thus effectively preventing the flow of liquid through that section of pipe. This ice plug acts as a temporary valve. When the ice plug is properly maintained (kept frozen), repairs can be performed on the pipe in the vicinity of the ice plug without the need to drain the piping system.

A common problem with pipe freezers is that after the freeze operation is complete the freeze heads and the evaporator are frozen to the pipe. This often leads to the operator forcing the freeze heads or evaporator to separate from the pipe causing damage to the pipe freezing equipment.

If one adds enough heat to the evaporators, the ice will melt, freeing the head or evaporator from the pipe. There are a few methods of defrosting the freeze heads and the evaporator. For example one can use a hair dyer, hot water, a heat gun, or flame to defrost the freeze heads and the evaporator. These methods are cumbersome and some are unsafe.

A method of defrosting the freeze heads is to use the hot gas from the system to defrost the freeze heads. This is a common defrost method incorporated within refrigeration systems.

Purpose of Invention

The purpose of the Pipe Freezer with Defrost Cycle is to freeze pipes on which it is desired to make repairs, and then to defrost the freeze heads and evaporators so that the pipe freezer can easily be removed from the frozen pipes.

DESCRIPTION OF RELATED ART INCLUDING INFORMATION DISCLOSED UNDER 37 CFR 1.97 AND 37 CFR 1.98.

The present inventor invented U.S. Pat. No. 4,309,875 issued to Arthur Radichio on Jan. 12, 1982 for a Pipe Freezer or the Like, in which a self contained freezing device forms a plug of ice within a pipe section. A refrigeration unit supplies refrigerant to a cradle-like freezer unit within which the section of pipe to be frozen is held in spaced relation to the inner face of the freezer. The space between the underside of the pipe and the inner face of the freezer is filled with water, for example, by spraying. As the water in contact with the cradle-like freezer-unit freezes, it covers the outer surface of the pipe section with an ice jacket. Alternatively, a bag of freezable gel may be substituted for the water spray and placed over the inside face of the freezer; and then the pipe section is placed within the fold of the bag. In the case of either alternative, the refrigerant is maintained inside the freezer, and out of contact with the pipe.

My U.S. Pat. No. 6,286,329 issued on Sep. 11, 2001 to Arthur Radichio for a Pipe Freezer. The pipe freezer uses a multi-cavity adapter having from two to eight cavities to fit standard plumbing pipes in copper, steel and plastic, metric and US standard. The refrigeration evaporator fits into a cylindrical bore in the core of the radial multi-cavity array. The cavities are arrayed around the circumference of the bore. The extrusion that forms the array is of aluminum or the like. Any of the cavities on the adapter body can be lined up with the pipe. When a single adapter is being used, the adapter is positioned on the pipe and secured with a strap having hook and loop fastening material. Then the cartridge evaporator is plugged into the adapter.

BRIEF SUMMARY OF THE INVENTION

Description of the Invention, Drawings, and New Features

This pipe freezer with defrost cycle invention has three embodiments, each of which provides for a defrost cycle in order to defrost the freeze heads and evaporalor after the pipe freezer has been used to create a frozen plug in the pipe it is desired to repair. The first and preferred embodiment uses a novel method to defrost the freeze heads and evaporators after the pipes it is desired to repair have been frozen:

A teeder tube runs within the suction line. This tube serves two purposes: first, during freeze mode, to feed the refrigerant to the evaporators for heat removal from the pipe. And second, during defrost mode, to deliver hot gas to the evaporator for defrost after the pipe freezing operation is complete in this embodiment, for at least a portion of its length the hot gas line is incorporated into the feeder tube.

To achieve this combination of freezing and defrosting the evaporators a common feeder is utilized. The feeder tube will allow very saturated vapor to flow from the metering devices to the evaporators when the system is in the freezing mode. In the hot gas mode (defrost mode) the hot refrigerant gas is diverted away from the condenser by incorporating a tee on the discharge line with an electrically or manually operated valve. When the hot gas is diverted to the feeder tube, it travels into the evaporator adding heat and defrosting the freeze heads and the evaporator. The refrigerant then travels back to the compressor through the suction line.

The best method for defrost is to use a manual on-off switch in conjunction with an electric valve. Other methods may be incorporated, such as including a hand valve, or a timer controlling an electric valve.

Current pipe freezers extend the metering device into the evaporator with the feeder tube. Other types of metering devices can be used in conjunction with the feeder tube such as thermostatic expansion valves, automatic expansion valves, electronic expansion valves, fixed orifice, and capillary tubes.

The second embodiment (nonpreferred) is similar to the preferred embodiment in that the saturated vapor tube runs through the suction line for at least a part of its length, but the hot gas line runs separately from and outside of the suction line, whereas with the preferred embodiment, for at least a part of its length the hot gas line is incorporated into the feeder tube.

The third embodiment (nonpreferred) is similar to the preferred embodiment except that it utilizes a reversing valve to provide different paths for the refrigerant depending upon whether the pipe freezer is in the freeze or defrost cycle.

The above features are objects of this invention. Yet further objects are as follows:

An object of the instant invention is to provide a pipe freezer with a defrost cycle so that the pipe freezer can easily be removed from the pipe to be repaired after a frozen plug has formed in the pipe.

A further object is to provide a pipe freezer with defrost cycle system that is economical in cost to manufacture.

Yet another object is to provide a pipe freezer with defrost cycle system which is light weight enough to be easily transported from place to place.

These and other objects, features, aspects, and advantages of the present invention will become better understood with regard to the following description, appended claims, and accompanying drawings and will be otherwise apparent to those skilled in the art.

For the purpose of illustration of this invention, a preferred embodiment is shown in the accompanying drawings. It is to be understood that this is for the purpose of example only and that the invention is not limited thereto.

DESCRIPTION

DETAILED DESCRIPTION OF THE INVENTION

My Pipe Freezer with Defrost Cycle invention has three embodiments. The first and preferred embodiment is the Pipe Freezer with Defrost Cycle with Incorporated Hot Gas Line. The second embodiment (nonpreferred) is referred to as the Pipe Freezer with Defrost Cycle with Separate Hot Gas Line. The third embodiment (nonpreferred) is the Pipe Freezer with Defrost Cycle with Reversing Valve.

Detailed Description of the Elements of the Preferred Embodiment

The Pipe Freezer with Defrost Cycle with Incorporated Hot Gas Line

Figure 1:
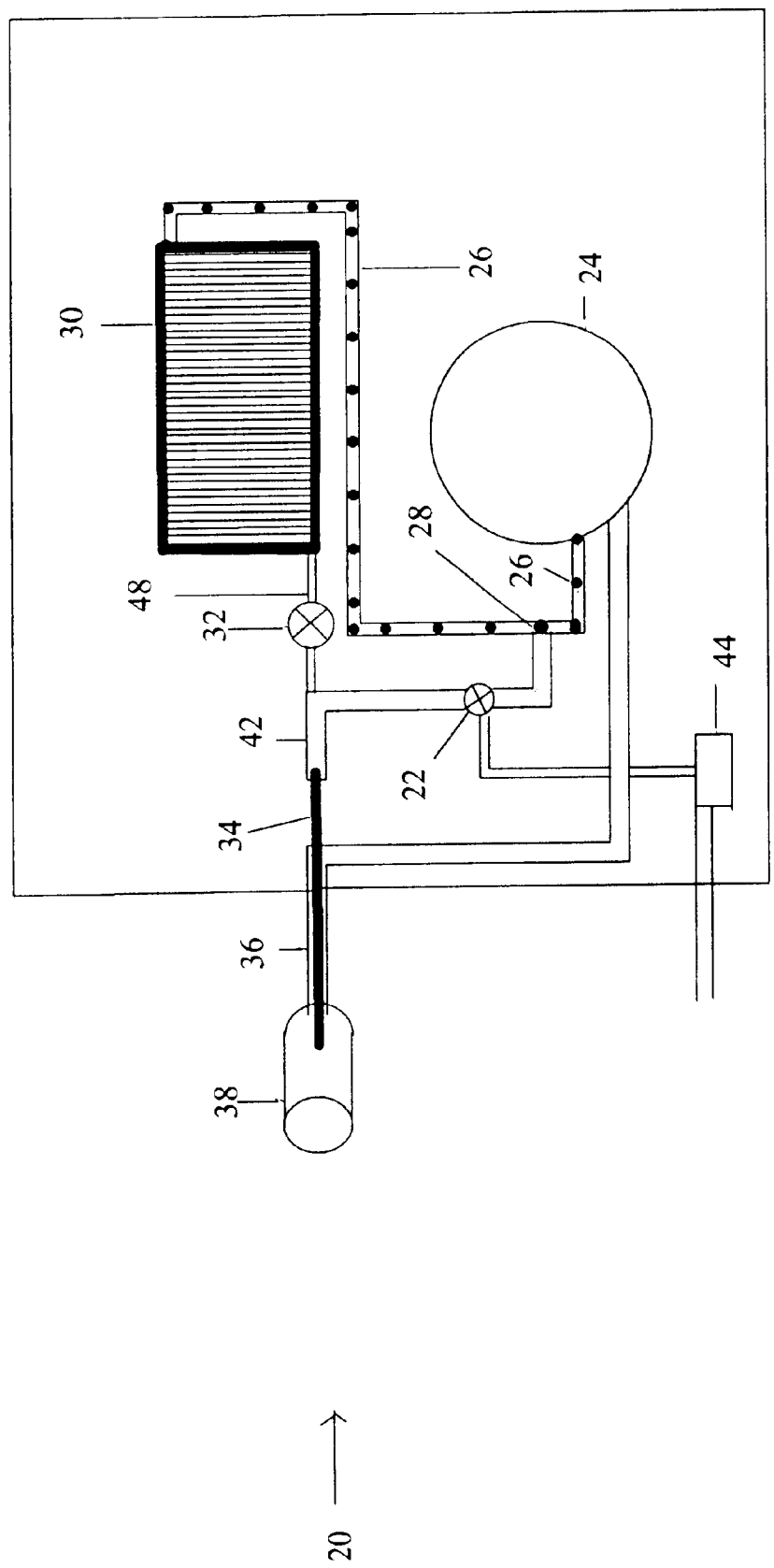
FIG. 1 is a schematic diagram of the Pipe Freezer with Defrost Cycle with Incorporated Hot Gas Line Embodiment in its freeze mode of operation.
Figure 9:
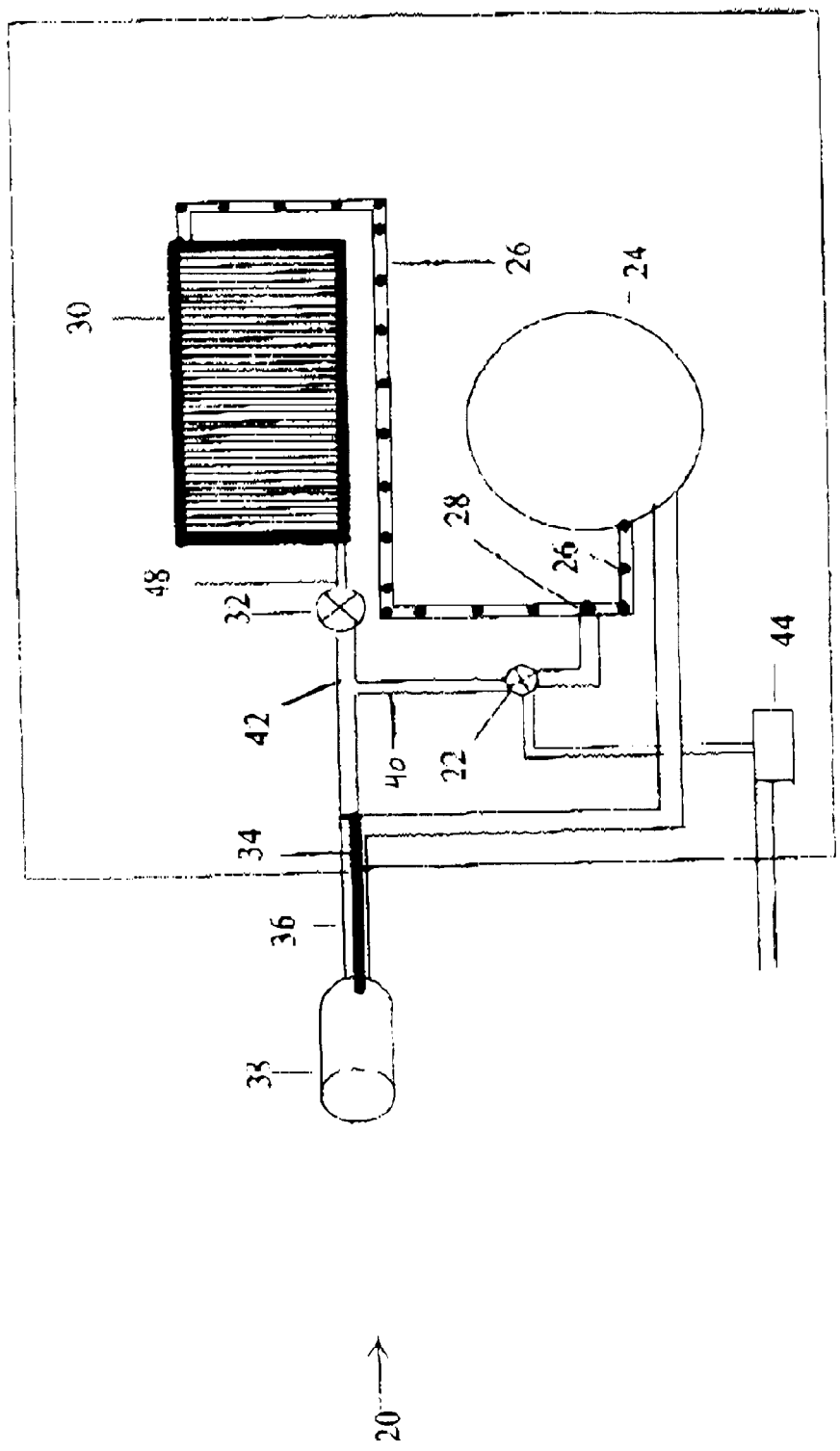
FIG. 9 is a schematic diagram of the Pipe Freezer with Defrost Cycle with incorporated Hot Gas Line Embodiment in its freeze mode of operation, wherein the feeder tube runs internal to the suction line for the full length of the feeder tube.

Turning now descriptively to the drawings, in which similar reference characters denote similar elements throughout the several views, FIG. 1 shows a schematic diagram of the Pipe Freezer with Defrost Cycle with Incorporated Hot Gas Line embodiment of my invention in its freeze mode of operation, this embodiment being generally designated by the numeral 20. When this embodiment is operating in the freeze mode, the electrically or manually operated hot gas valve 22 is set to the closed position, thus blocking flow of refrigerant through it. The compressor 24 compresses the refrigerant from a Low pressure to a high pressure, and the compressed refrigerant exits the compressor 24 via the discharge line 26. After traveling a short distance down the discharge line 26, the compressed refrigerant comes to the discharge line tee 28 which leads to the hot gas valve 22, which, as mentioned above, is closed in freeze mode, thus causing all the compressed refrigerant to be transported down the discharge line 26 and into the condenser 30. In the condenser 30, the compressed gas is condensed, saturated and sub-cooled. The saturated liquid refrigerant enters the metering device 32 and is metered into the feeder tube 34 (functioning as a saturated vapor feeder tube), which enters and is enclosed within the suction line 36 for at least part of the length of the suction line 36. FIG. 9 shows an embodiment in which the feeder tube 34 runs internal to the suction line 36 for the full length of the feeder tube 34. Continuing to pass down the feeder tube 34, the refrigerant enters the evaporator 38, removing heat from any surface in contact with the evaporator 38. The refrigerant vapor then enters the suction line 36 and travels back to the compressor 24. As just mentioned, the feeder tube 34 runs internal to the suction line 36 for at least a portion of the length of the suction line 36.

Figure 7:
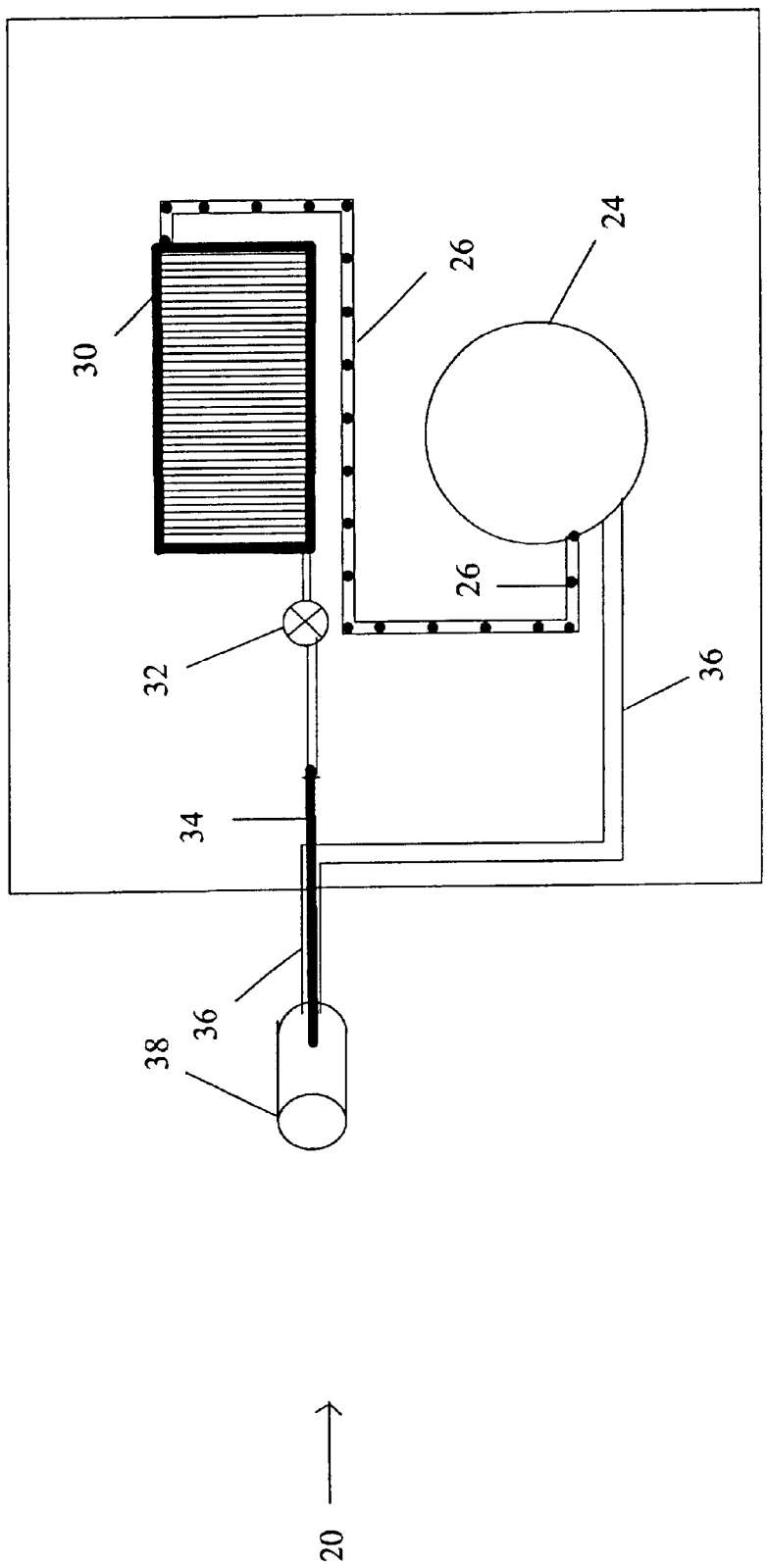
FIG. 7 is a schematic diagram of the Pipe Freezer with Defrost Cycle with Incorporated Hot Gas Line Embodiment in its freeze mode of operation, showing just those elements and pathways participating in the freezing mode.

FIG. 7 shows a schematic diagram of the freezing mode of the Pipe Freezer with Defrost Cycle with Incorporated Hot Gas Line embodiment of my invention, showing just those elements participating in the freezing mode. The dots in FIG. 7 show the path followed by the refrigerant in freezing mode, with inactive components and pathways not shown.

Figure 2:
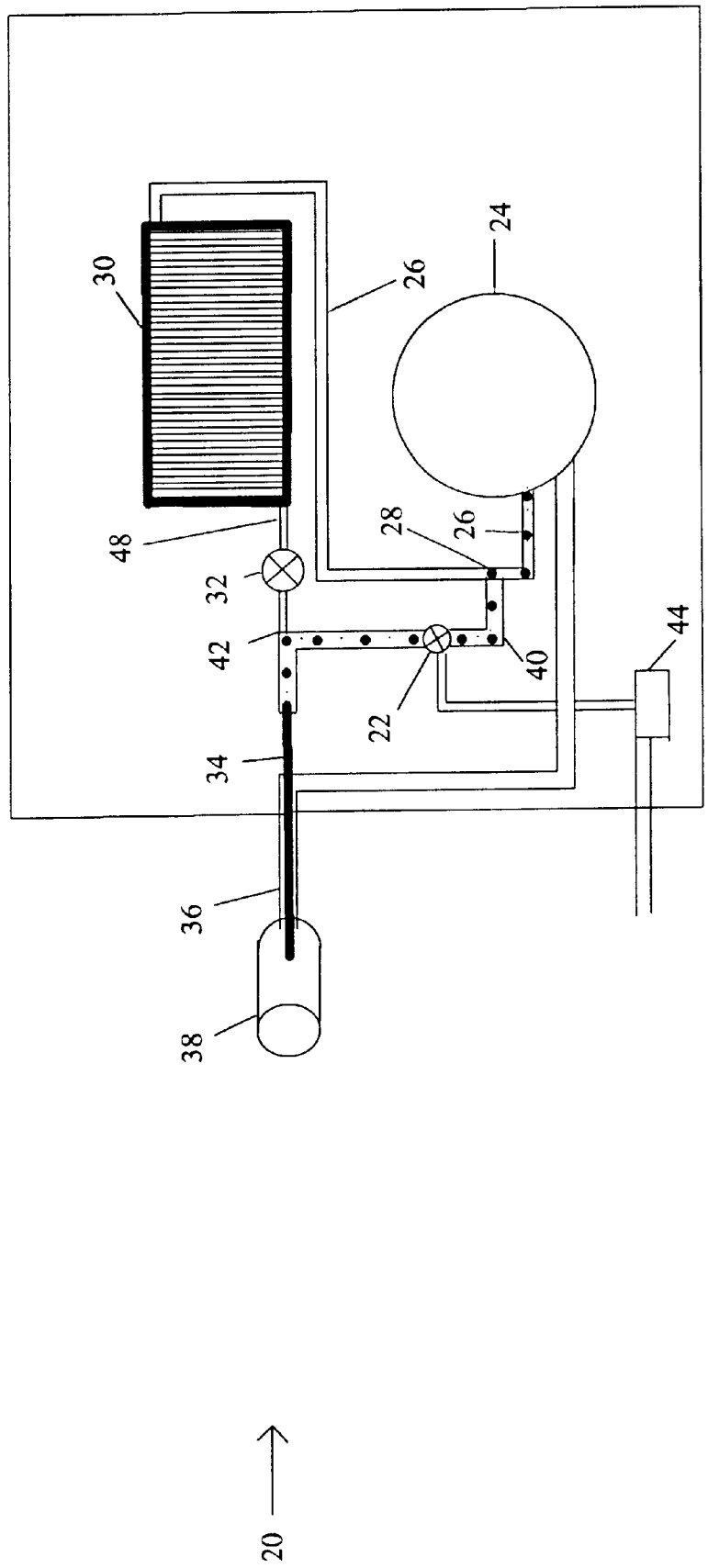
FIG. 2 is a schematic diagram of the Pipe Freezer with Defrost Cycle with Incorporated Hot Gas Line Embodiment in its defrost mode of operation.

FIG. 2 shows a schematic diagram of the Pipe Freezer with Defrost Cycle with Incorporated Hot Gas Line embodiment of my invention in its defrost mode of operation, this embodiment again being generally designated by the numeral 20. When this embodiment is operating in the defrost mode, the electrically or manually operated hot gas valve 22 is set to the open position, thus allowing flow of refrigerant through it. The compressor 24 compresses the refrigerant from a low pressure to a high pressure causing the temperature of the refrigerant to rise, and the hot compressed refrigerant exits the compressor 24 via the discharge line 26. After traveling a short distance down the discharge line 26, the compressed refrigerant flows into the discharge line tee 28 which feeds the refrigerant into the hot gas line 40. The hot gas line 40 then leads the refrigerant to the hot gas valve 22, which, as mentioned above, is open in defrost mode. Any refrigerant, however, which attempts to flow down the discharge line 26 and into the condenser 30, encounters heavy resistance when it exits the condenser 30 and attempts to pass through the metering device 32, and only a thin trickle of refrigerant passes through the metering device 32. Therefore, being essentially blocked from flowing down the discharge line 26, most of the hot compressed refrigerant from the compressor 24 passes through the discharge line tee 28, through the hot gas valve 22, and on to the feeder tube tee 42. Due to the above mentioned thin trickle of refrigerant passing through the metering device 32 from the condenser, refrigerant passing into the feeder tube tee 42 is blocked from flowing through the metering device 32 and into the condenser 30. Thus, the hot compressed refrigerant which flows into the feeder tube tee, being blocked from flowing through the metering device 32, flows down the saturated vapor feeder tube 34 and into the evaporator 38. (This is what is meant by saying that the hot gas line 40 is incorporated into the feeder tube 34 from the feeder tube tee 42 all the way to the evaporator 38. The feeder tube 34 performs the function of the hot gas line all the way from the feeder tube tee 42 all the way to the evaporator 38.) This hot compressed refrigerant heats the evaporator 38 and freeze heads (not shown) thus defrosting them. The refrigerant then exits the evaporator.38 via the suction line 36 and is transported back to the compressor 24. As mentioned previously, in this embodiment, as shown in FIG. 2, the saturated vapor feeder tube 34 runs internal to the suction line 36 for at least a portion of the length of the suction line 36.

Figure 8:
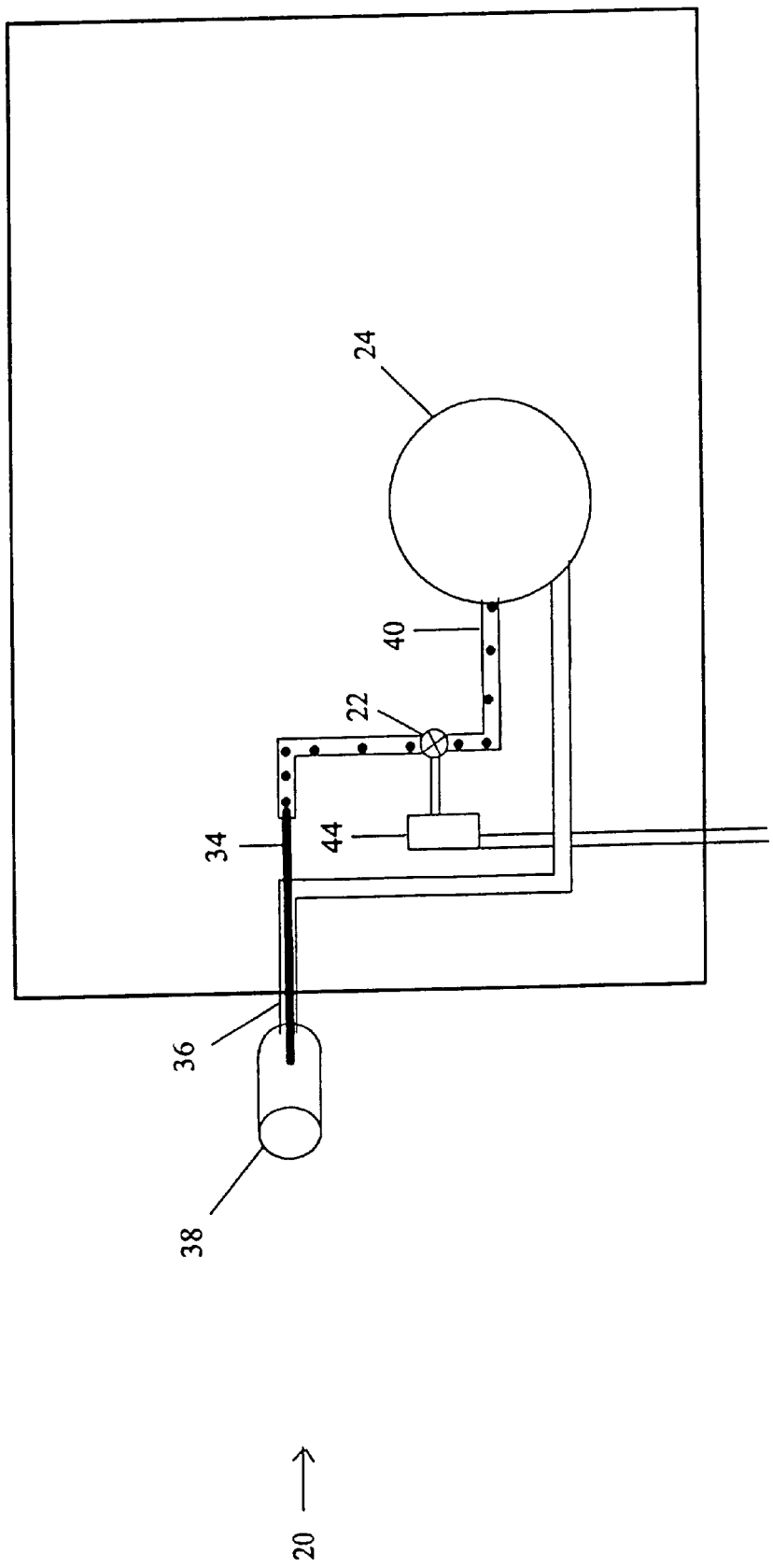
FIG. 8 is a schematic diagram of the Pipe Freezer with Defrost Cycle with Incorporated Hot Gas Line Embodiment in its defrost mode of operation, showing just those elements participating in the defrost mode.

FIG. 8 shows a schematic diagram of the defrost mode of the Pipe Freezer with Defrost Cycle with Incorporated Hot Gas Line embodiment of my invention, showing just those elements participating in the defrost mode. The dots of FIG. 8 show the path followed by the refrigerant in defrost mode, with inactive components and pathways not shown.

Thus we see that the feeder tube 34 serves two purposes: first, during the freeze mode, to feed the refrigerant to the evaporator 38 for heat removal from a pipe. In this first purpose, the feeder tube 34 is functioning as a refrigerant line or saturated vapor feeder tube. And second, during the defrost mode, the feeder tube 34 delivers hot gas to the evaporator 38 for defrost after the pipe freezing operation is complete. In this second purpose, the feeder tube 34 is functioning as a hot gas line.

Thus, to achieve the combination of freezing and defrosting the evaporators, a common feeder is utilized. The feeder tube 34 allows very saturated vapor to flow from the metering device 32 to the evaporator(s) when the system is in the freezing mode. The dots in FIG. 1 show the flow path of the refrigerant. In the hot gas mode (defrost) the hot refrigerant gas is diverted away from the condenser 30 by incorporating a tee 28 on the discharge line 26 with an electrically or manually operated valve 22. When the hot gas is diverted from the discharge line 26 entering the condenser 30, to the Saturated Vapor and Hot Gas Feeder tube 34, it travels into the evaporator 38 adding heat and defrosting the freeze heads (not shown) and the evaporator 38. The dots in FIGS. 2 and 8 show this path. (This diversion takes place because the metering device 32 offers much resistance to refrigerant passing through it, and thus the majority of refrigerant passes into the tee 28 instead.) The refrigerant then travels back to the compressor 24 through the suction line 36.

The best method for defrost is to use a manual on-off switch 44 in conjunction with an electric valve 22. Other methods may be incorporated, such as including a hand valve, or a timer controlling an electric valve.

Current pipe freezers extend the metering device into the evaporator with a capillary tube. Other types of metering devices can be used in conjunction with the feeder tube such as thermostatic expansion valves, automatic expansion valves, electronic expansion valves, fixed orifice, and capillary tubes.

Detailed Description of the Elements of the Nonpreferred Embodiments

A. The Pipe Freezer with Defrost Cycle with Separate Hot Gas Line

Figure 3:
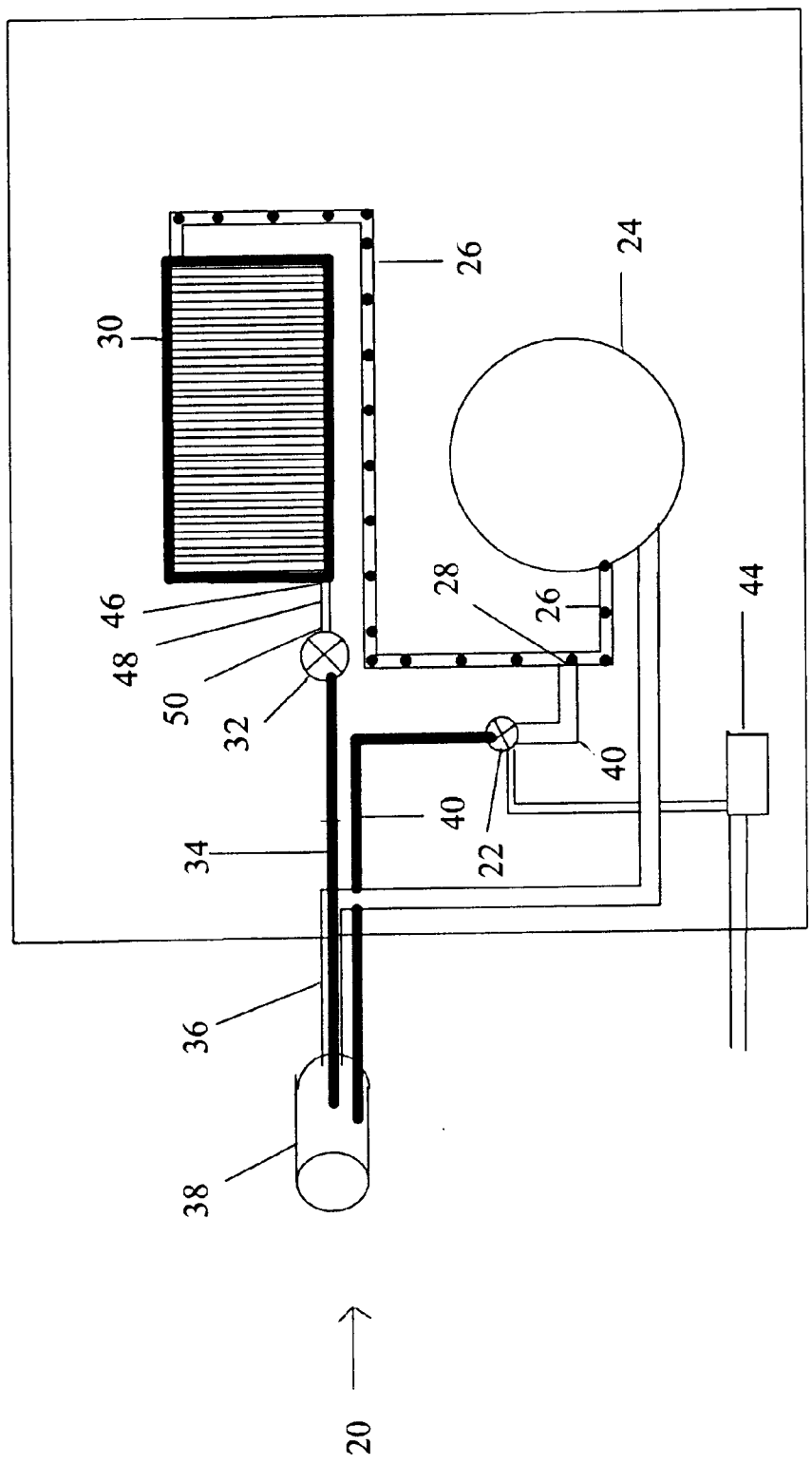
FIG. 3 is a schematic diagram of the Pipe Freezer with Defrost Cycle with Separate Hot Gas Line Embodiment in its freeze mode of operation.

FIG. 3 shows a schematic diagram of the Pipe Freezer with Defrost Cycle with Separate Hot Gas Line embodiment of my invention in its freeze mode of operation, this embodiment being generally designated by the numeral 20. When this embodiment is operating in the freeze mode, the electrically or manually operated hot gas valve 22 is set to the closed position, thus blocking flow of refrigerant through it. The compressor 24 compresses the refrigerant from a low pressure to a high pressure, and the compressed refrigerant exits the compressor 24 via the discharge line 26. After traveling a short distance down the discharge line 26 the compressed refrigerant comes to the discharge line tee 28 which leads to an electrically or manually operated hot gas valve 22, which, as previously mentioned, is closed in freeze mode, thus causing all the compressed refrigerant to be transported down the discharge line 26 and into the condenser 30. In the condenser 30 the compressed gas is condensed, saturated and sub-cooled. The saturated liquid refrigerant exits the condenser 30, and enters the inlet 46 of the liquid line 48. Upon exiting the outlet 50 of the liquid line 48, the refrigerant enters the metering device 32 and is metered into the feeder tube 34 (functioning as a saturated vapor feeder tube), from whence the refrigerant enters the evaporator 38, and removes heat from any surface in contact with the evaporator 38. The refrigerant vapor then enters the suction line 36 and travels back to the compressor 24. In this embodiment, the feeder tube 34 runs internal to the suction line 36 for at least a portion of the length of the suction line 36.

Figure 4:
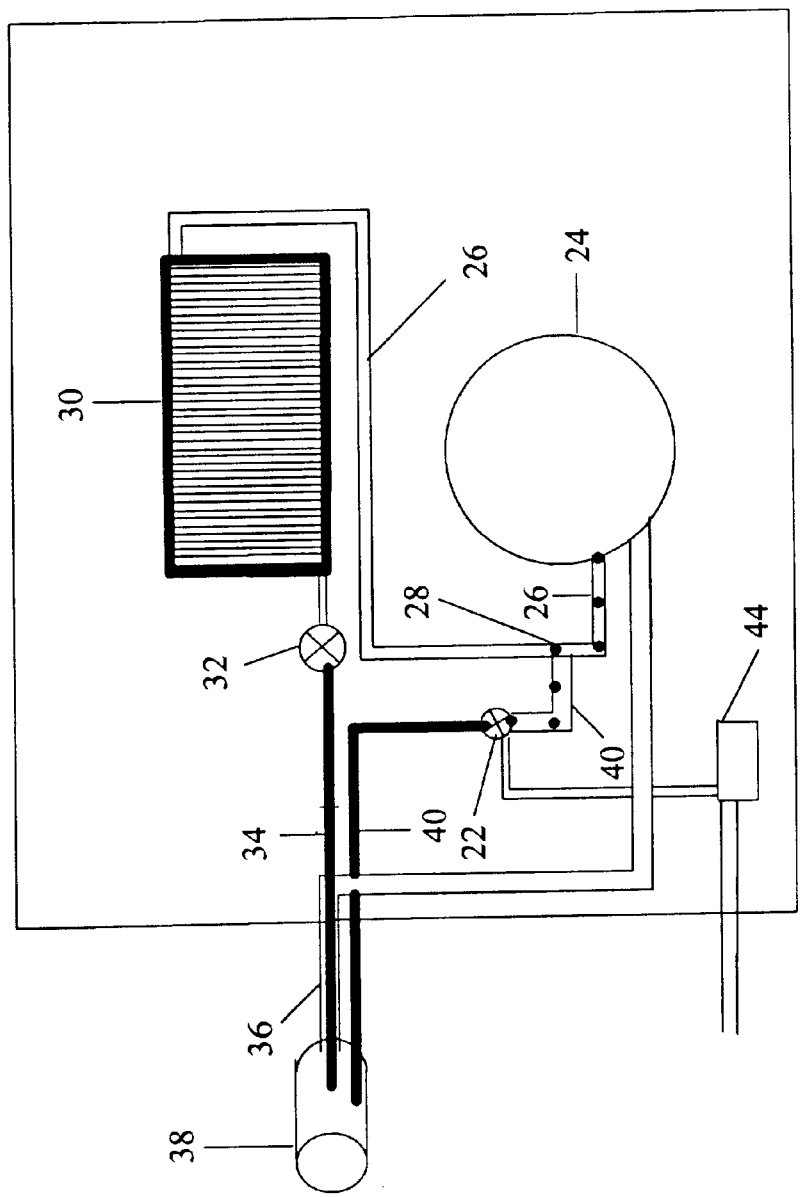
FIG. 4 is a schematic diagram of the Pipe Freezer with Defrost Cycle with Separate Hot Gas Line Embodiment in its defrost mode of operation.

FIG. 4 shows a schematic diagram of the Pipe Freezer with Defrost Cycle with Separate Hot Gas Line embodiment of my invention in its defrost mode of operation, this embodiment being generally designated by the numeral 20. When this embodiment is operating in the defrost mode, the electrically or manually operated hot gas valve 22 is set to the open position, thus allowing refrigerant to flow through it. The compressor 24 compresses the refrigerant from a low pressure to a high pressure causing the temperature of the refrigerant to rise, and the compressed refrigerant exits the compressor 24 via the discharge line 26. After traveling a short distance down the discharge line 26 the compressed refrigerant comes to the discharge line tee 28 which feeds the compressed refrigerant into the hot gas line 40. The hot gas line 40 in turn feeds the compressed refrigerant into an electrically or manually operated hot gas valve 22, which, as mentioned above, is open in defrost mode. Please note that any refrigerant continuing on down the discharge line 26 into the condenser 30 is effectively blocked at the output of the condenser 30 by the metering device 32 which only lets a small amount of refrigerant through. Therefore most of the hot compressed refrigerant from the compressor 24 passes into the discharge line tee 28, through the hot gas valve 22, and on to the evaporator 38 via the separate hot gas line 40. This hot compressed refrigerant heats the evaporator 38 and freeze heads (not shown) thus defrosting them. The refrigerant then exits the evaporator 38 via the suction line 36 and is then transported back to the compressor 24. As mentioned previously, in this embodiment, the saturated vapor feeder tube 34 runs internal to the suction line 36 for at least a portion of the length of the suction line 36, and the hot gas line 40 is separate from the suction line 36.

B. The Pipe Freezer With Defrost Cycle With Reversing Valve

Figure 5:
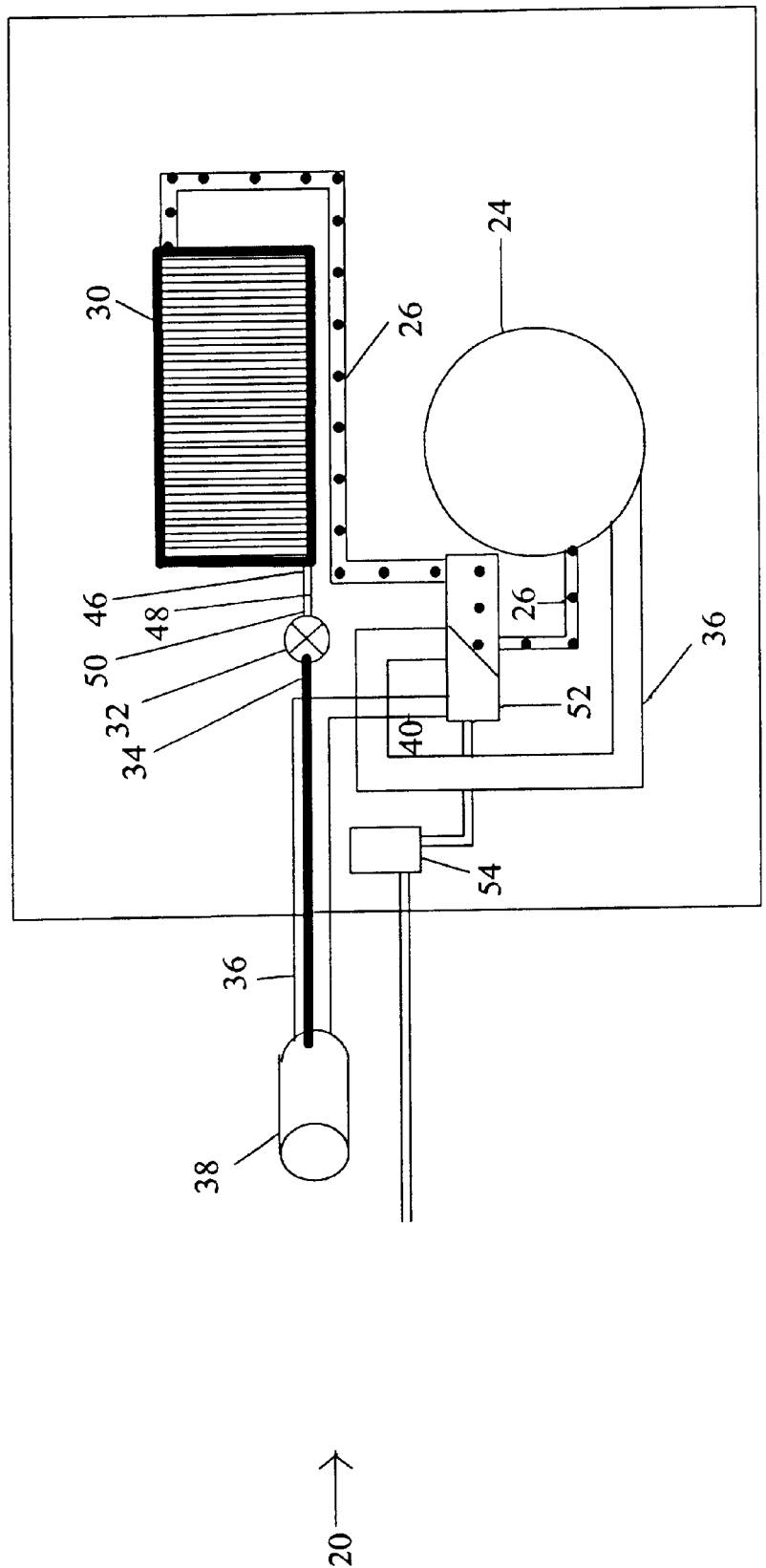
FIG. 5 is a schematic diagram of the Pipe Freezer with Defrost Cycle with Reversing Valve Embodiment in its freeze mode of operation.

FIG. 5 shows a schematic diagram of the Pipe Freezer with Defrost Cycle with Reversing Valve embodiment of my invention in its freeze mode of operation, this embodiment being generally designated by the numeral 20. When this embodiment is operating in the freeze mode, the reversing valve 52 is set to allow the flow of hot compressed gas from the compressor 24 to the condenser 30. The compressor 24 compresses the refrigerant from a low pressure to a high pressure, and the compressed refrigerant exits the compressor 24 via the discharge line 26. After traveling a short distance down the discharge line 26, the compressed refrigerant enters the right chamber of the electric reversing valve 52, and then continues to be transported down the discharge line 26 and into the condenser 30. In the condenser 30, the compressed gas is condensed, saturated and sub-cooled. The saturated liquid refrigerant exits the condenser 30, and enters the inlet 46 of the liquid line 48. Upon exiting the outlet 50 of the liquid line 48, the refrigerant enters the metering device 32 and is metered into the feeder tube 34 (functioning as a saturated vapor tube or saturated refrigerant line), from whence the refrigerant enters the evaporator 38, and removes heat from any surface in contact with the evaporator 38. The refrigerant vapor then enters the suction line 36 and travels through the left chamber of the reversing valve 52, then back to the compressor 24. In this embodiment, the feeder tube 34 runs internal to the suction line 36 for at least a portion of the length of the suction line 36.

Figure 6:
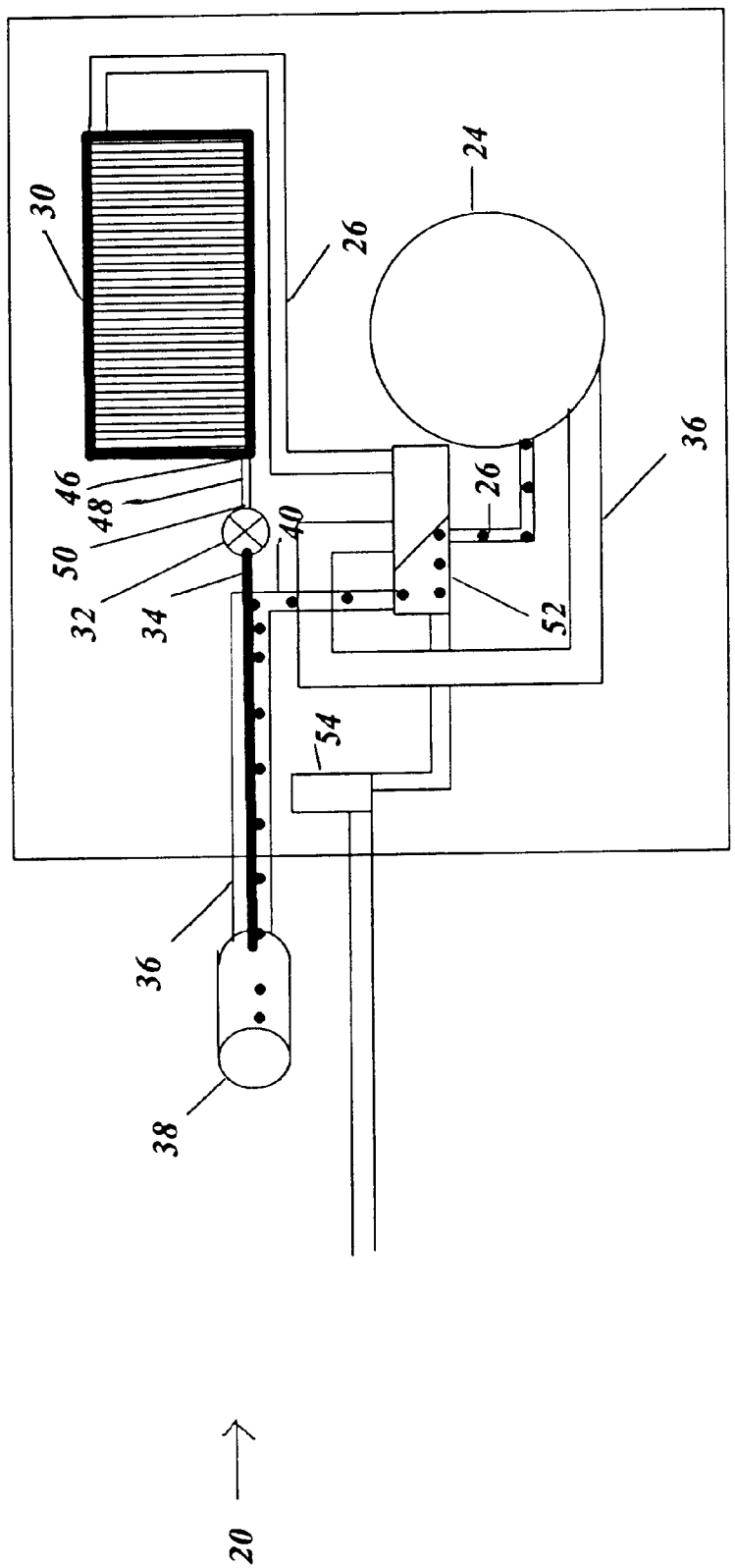
FIG. 6 is a schematic diagram of the Pipe Freezer with Defrost Cycle with Reversing Valve Embodiment in its defrost mode of operation.

FIG. 6 shows a schematic diagram of the Pipe Freezer with Defrost Cycle with Reversing Valve embodiment of my invention in its defrost mode of operation, this embodiment being generally designated by the numeral 20. When this embodiment is operating in the defrost mode, the reversing valve 52 is set to allow the flow of hot compressed gas from the compressor 24 to the evaporator 38. The compressor 24 compresses the refrigerant from a low pressure to a high pressure causing the temperature of the refrigerant to rise, and the hot compressed refrigerant gas exits the compressor 24 via the discharge line 26. After traveling a short distance down the discharge line 26, the compressed refrigerant flows into the left chamber of the reversing valve 52 which feeds the refrigerant into the hot gas line 40, which in turn feeds the refrigerant into the outer line/suction line 36 (which in the freezing mode is the suction line) which transports the hot refrigerant gas into the evaporator 38 for defrosting after a pipe freezing job is complete. The hot gas is condensed into a liquid within the evaporator 38 and flows into the metering device 32 via the feeder tube 34 (functioning as a liquid line), and then into the condenser 30 (which now acts as an evaporator). Heat is absorbed from the air. Then the refrigerant travels through the right chamber of the reversing valve 52 and into the suction line 36 back to the compressor 24. In this embodiment, as shown in FIG. 6, the feeder tube 34 runs internal to the suction line 36 for at least a portion of the length of the suction line 36.

A switch 54 pilots the reversing valve 52.

Feeder Tube Operation and Novelty

Hot gas defrost methods:

To achieve hot gas defrost in the freezers of the background art using the teachings of the background art, it is customary to run a hot gas line from the compressor discharge into the evaporator employing a third refrigerant line external to the suction line. Another background art method that is used is to incorporate a reverse cycle; a major drawback to this approach is cost, both methods require much additional labor.

The function of the feeder tube 34 in Applicant's invention is to deliver cold evaporating refrigerant from the metering device 32 to the evaporator 38 for the freeze cycle and to deliver hot refrigerant gas from the compressor discharge line 26 to the evaporator 38 for the defrost cycle. The feeder tube 34 extends from the tee 42 (joining the hot gas line 40 and the outlet of the metering device 32) to the inlet of the evaporator 38 and runs within the suction line to the evaporator. The feeder tube is sized so as not to impede the refrigerant returning back to the compressor 24. By so utilizing a feeder tube 34 in my invention, the metering device 32 is no longer restricted to a capillary tube running within the suction line, because in my invention metering now takes place at the inlet of the feeder tube and refrigerant flows through the feeder tube 34 and into the evaporator 38 during the freeze cycle. Therefore with the improvement taught by Applicant's invention, other metering devices can now be used such as: Thermostatic expansion valves, automatic expansion valves, hand valves, and electronic expansion valves.

The advantages of using a feeder tube that delivers both evaporating refrigerant in the freezing cycle, and hot gas in the defrost cycle are:

1. A third tube is not required to accomplish the defrost cycle. Using a third tube results in increased labor and material costs in the manufacturing process, and requires a much larger suction line witch reduces flexibility and adds to the weight of the unit.
2. Refrigerant metering can now take place within the compressor housing making available more precise metering devices such as:
   a. Thermostatic expansion valves
   b. Automatic expansion valves
   c. Fixed orifices
   d. Electronic expansion valves
   e. Capillary tubes.
3. Pipe freezer costs reduced:
   a. Expensive four way valve not required
   b. Additional labors not required.
4. Feeder tube can be used with:
   a. Inexpensive capillary metering device
   b. High efficiency valve.
5. Weight reduction.
6. Ease of manufacturing Advantages of the Invention The pipe freezer with defrost cycle system has advantages of efficiency, reasonable weight, and ease of use.

The instant invention, unlike most background art devices, has a defrost cycle.

The instant invention is easy to use with most conventional pipe freezers.

The instant invention is economical to manufacture and easy to use.

List of Reference Numbers

20 Pipe Freezer with Defrost Cycle
22 electrically or manually operated hot gas valve
24 compressor
26 discharge line
28 discharge line tee 30 condenser
32 metering device
34 feeder tube
36 suction line
38 evaporator
40 hot gas line
42 feeder tube tee
44 manual on-off switch
46 inlet of liquid line
48 liquid line
50 outlet of liquid line
52 reversing valve
54 switch piloting the reversing valve It will be understood that each of the elements described above, or two or more together may also find a useful application in other types of devices and methods differing from those types described above.

Alternatives and the Closing

Thus the reader will see that my Pipe Freezer with Defrost Cycle supplies a long felt need for a simple, economical, easy to use means for freezing a pipe which is to be repaired, and after the pipe is frozen, to then defrost the freeze heads and evaporator so that the pipe freezer may be removed from the frozen pipes without damaging the pipe freezer.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

While the present invention has been described in terms of the preferred embodiment and generally associated methods, the inventor contemplates that alterations and permutations of the preferred embodiment and method will become apparent to those skilled in the art upon a reading of the specification and a study of the drawings. Accordingly, the above description of preferred exemplary embodiments does not define or constrain the present invention. Rather, the issued claims variously define the present invention. Each variation of the present invention is limited only by the recited limitations of its respective claim, and equivalents thereof, without limitation by other terms not present in the claim. Further, aspects of the present invention are particularly pointed out below using terminology that the inventor regards as having its broadest reasonable interpretation; the more specific interpretations of 35 U.S.C. .sctn. 112(6) are only intended in those instances where the term "means" is actually recited.

What is claimed is:

1. A pipe freezer with defrost cycle, said pipe freezer having a freezing mode and a defrost mode, said pipe freezer comprising a refrigeration unit, said refrigeration unit comprising:

(a) compressor for compressing a refrigerant from a low pressure to a high pressure;
   (b) a condenser downstream of the compressor for condensing the refrigerant from a high temperature gas to a lower temperature liquid;
   (c) a discharge line extending from the compressor to the condenser for transporting refrigerant from the compressor to the condenser;
   (d) an evaporator having an inner chamber, said evaporator having:
      (i) a feeder tube extending into the evaporator and protruding into the inner chamber of the evaporator for moving:
         1. during the freezing mode, a refrigerant into the inner chamber of the evaporator at a predetermined rate, said feeder tube thus functioning as a refrigerant line, and
         2. during the defrost mode, a hot gas into the inner chamber of the evaporator at a predetermined rate, said feeder tube thus functioning as a hot gas line;
      (ii) a suction line having a length, said suction line extending out of the evaporator for moving:
         1. during the freezing mode, evaporated refrigerant out of the inner chamber of the evaporator, and transporting the evaporated refrigerant back to the compressor, and
         2. during the defrost mode, hot gas out of the inner chamber of the evaporator, and transporting the hot gas back to the compressor;
   wherein said feeder tube runs internal to the suction line for at least a portion of the length of the suction line;
   (e) a liquid line having an inlet and an outlet, said liquid line receiving refrigerant from the condenser at said inlet, and having a metering device at said outlet for metering liquid refrigerant into the feeder tube; and
   (f) means for modifying access to the condenser in defrost mode.

2. The pipe freezer with defrost cycle of claim 1, wherein the feeder tube runs internal to the suction line for the full length of the feeder tube.

3. The pipe freezer with defrost cycle of claim 1, wherein the means for modifying access to the condenser in defrost mode comprises:

(a) a tee in the feeder tube;
   (b) a hot gas line from the compressor to the tee in the feeder tube, said tee in the feeder tube thus performing the function of incorporating said hot gas line into said feeder tube;
   (c) a hot gas valve in said hot gas line, wherein,
      (i) when said pipe freezer is in the freeze mode, the metering device and the hot gas valve cooperate to allow communication between the condenser and the evaporator, said feeder tube receiving refrigerant from the metering device which received refrigerant from the condenser and transporting said refrigerant to the evaporator, said feeder tube thus functioning as a refrigerant line; and,
      (ii) when said pipe freezer is in the defrost mode, the metering device and the hot gas valve cooperate to allow communication between the compressor and the evaporator, thus modifying access to the condenser by bypassing the condenser altogether,
   whereby said hot gas line in conjunction with said feeder tube facilitates communication between the compressor and the evaporator in the defrost mode by transporting hot refrigerant gas from the compressor to the evaporator.

4. The pipe freezer with defrost cycle of claim 3, further comprising a switch for piloting the hot gas valve.

5. The pipe freezer with defrost cycle of claim 3, wherein the means for modifying access to the condenser in defrost mode further comprises a tee on the discharge line for diverting the hot refrigerant gas away from the condenser, and toward the evaporator.

6. A pipe freezer with defrost cycle, said pipe freezer having a freezing mode and a defrost mode, said pipe freezer comprising a refrigeration unit, said refrigeration unit comprising:
  (a) a compressor for compressing a refrigerant from a low pressure to a high pressure;
  (b) a condenser downstream of the compressor for condensing the refrigerant from a high temperature gas to a lower temperature liquid;
  (c) a discharge line extending from the compressor to the condenser for transporting refrigerant from the compressor to the condenser;
  (d) an evaporator having an inner chamber, said evaporator having:
    (i) a feeder tube extending into the evaporator and protruding into the inner chamber of the evaporator for moving:
      1. during the freezing mode, a refrigerant into the inner chamber of the evaporator at a predetermined rate, said feeder tube thus functioning as a refrigerant line, and
      2. during the defrost mode, a hot gas into the inner chamber of the evaporator at a predetermined rate, said feeder tube thus functioning as a hot gas line;
    (ii) a suction line having a length, said suction line extending out of the evaporator for moving:
      1. during the freezing mode, evaporated refrigerant out of the inner chamber of the evaporator, and transporting the evaporated refrigerant back to the compressor, and
      2. during the defrost mode, hot gas out of the inner chamber of the evaporator, and transporting the hot gas back to the compressor;
  wherein said feeder tube runs internal to said suction line for at least a portion of the length of the suction line;
  (e) a tee on the discharge line for diverting the hot refrigerant gas away from the condenser, and toward the evaporator;
  (f) a liquid line having an inlet and an outlet, said liquid line receiving refrigerant from the condenser at said inlet, and having a metering device at said outlet for metering liquid refrigerant into the feeder tube;
  (g) means for modifying access to the condenser in defrost mode, said means comprising:
    (i) a tee in the feeder tube;
    (ii) a hot gas line from the compressor to the tee in the feeder tube, said tee in the feeder tube thus performing the function of incorporating said hot gas line into said feeder tube;
    (iii) a hot gas valve in said hot gas line, wherein,
      (1) when said pipe freezer is in the freeze mode, the metering device and the hot gas valve cooperate to allow communication between the condenser and the evaporator, said feeder tube receiving refrigerant from the metering device which received refrigerant from the condenser and transporting it to the evaporator, said feeder tube thus functioning as a refrigerant line; and,
      (2) when said pipe freezer is in the defrost mode, the metering device and the hot gas valve cooperate to allow communication between the compressor and the evaporator, thus modifying access to the condenser by bypassing the condenser altogether;
    (iv) a switch for piloting the hot gas valve;
  whereby said hot gas line in conjunction with said feeder tube facilitates communication between the compressor and the evaporator in the defrost mode by transporting hot refrigerant gas from the compressor to the evaporator.

7. The pipe freezer with defrost cycle of claim 6, wherein the feeder tube runs internal to the suction line for the full length of the feeder tube.

* * * * *